INVENTOR
Martin Preston
by D. E. Moehling
Attorney

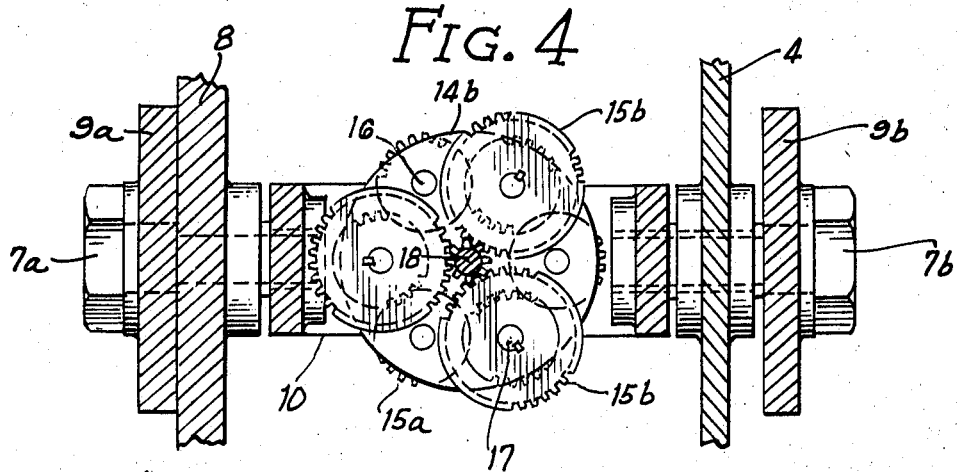
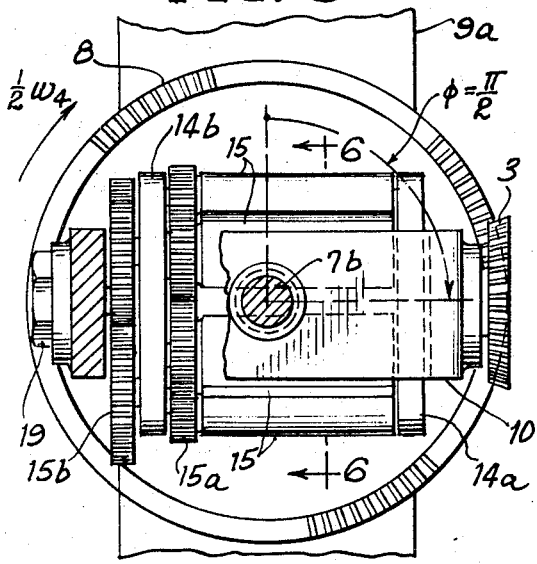
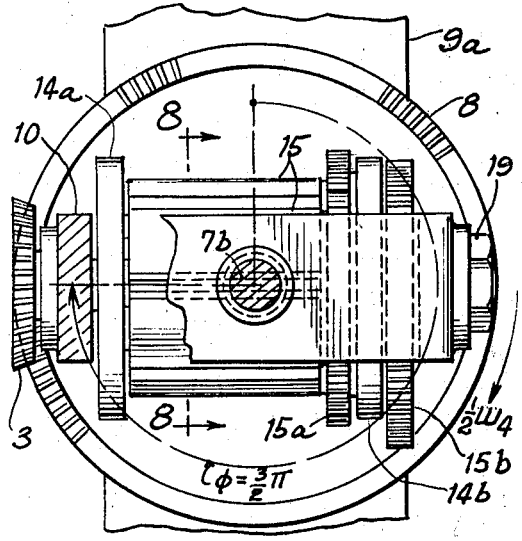
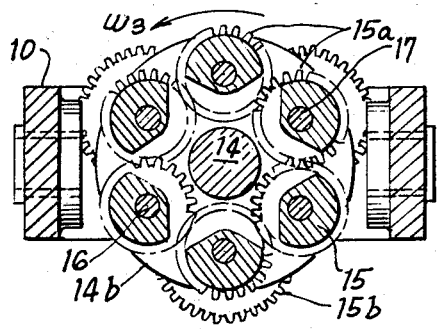
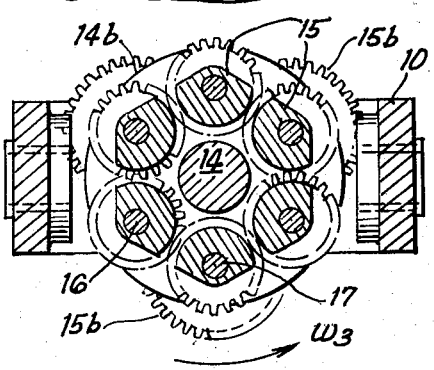

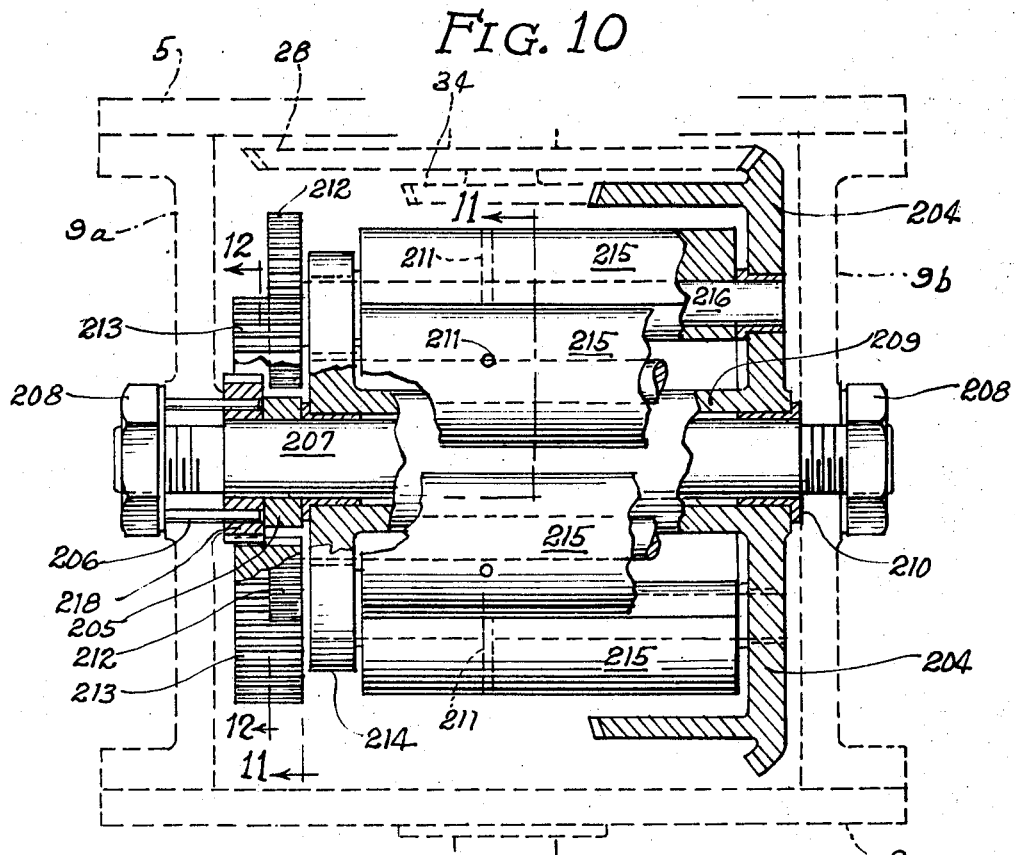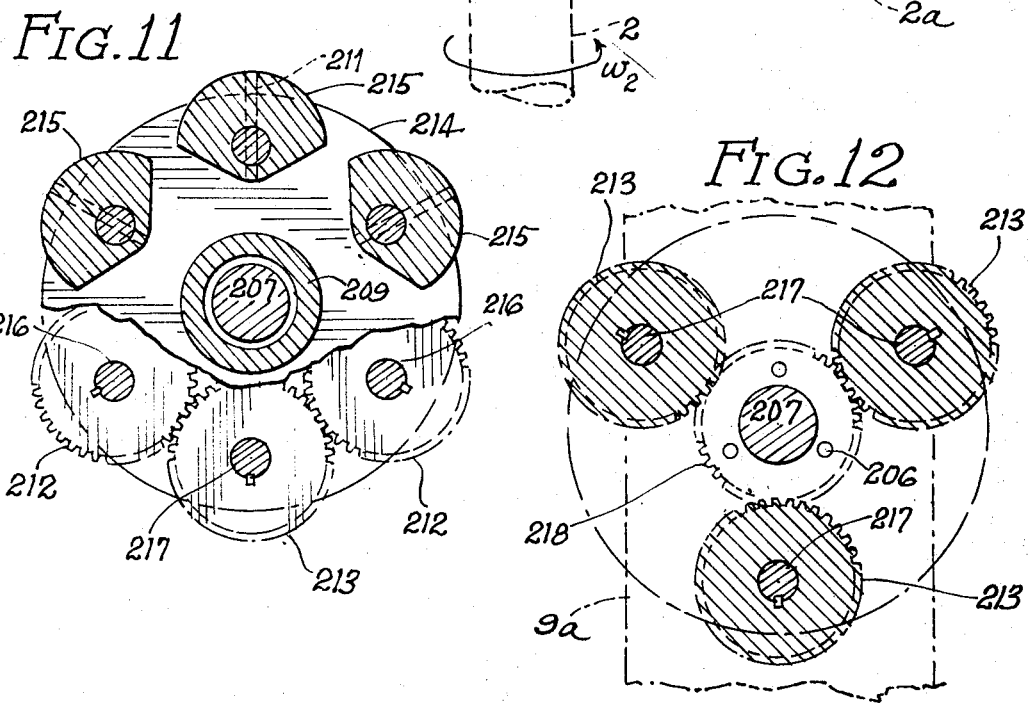

United States Patent Office 3,439,561
Patented Apr. 22, 1969

3,439,561
MECHANICAL TORQUE CONVERTER
Martin Preston, 300 N. State St., Apt. 5701,
Chicago, Ill. 60616
Continuation-in-part of application Ser. No. 639,804,
May 19, 1967, which is a continuation-in-part of
application Ser. No. 594,061, Nov. 16, 1966,
which is a continuation-in-part of application Ser.
No. 501,637, Oct. 22, 1965. This application Apr.
12, 1968, Ser. No. 720,804
Int. Cl. F16h 3/74
U.S. Cl. 74—751                          8 Claims

ABSTRACT OF THE DISCLOSURE

A stepless, variable-speed power transmitting device in which the ratio of the input and output shaft speeds depends (a) on the external torque load applied to the output shaft and (b) on the speed of the power driven input shaft. Power is transmitted from the input to the output shaft through a spinning rotor having diametrically opposed, eccentrically revolving weights, the kinetic energy of which is therefore cyclically variable as the resulting rotational speed and mass inertia of the rotor also varies cyclically. During one phase of the working cycle energy is transmitted by a gear train from the input shaft to the rotor and during another phase part of the energy is recirculated to the input shaft and part of it is transmitted to the output shaft.

Cross-reference to earlier applications

This application is a continuation-in-part of my copending application Ser. No. 639,804, filed May 19, 1967, now Patent No. 3,394,619, which is a continuation-in-part of application Ser. No. 594,061, filed Nov. 16, 1966, now abandoned, which in turn is a continuation-in-part of application Ser. No. 501,637, filed Oct. 22, 1965, now abandoned.

Description of the invention

In parent applications, Ser. Nos. 501,637, 594,061, and 639,804, I disclosed a mechanical torque converter which, in common with the device of this invention, comprises a rotatable spin axle carrying a variable inertia rotor consisting of at least two fly-weights, the centers of gravity of which vary cyclically in their radial distance from the center of the spin axle. In the former parent applications, the cyclic variation in the radial distance of the fly-weights was effected by cams acting on cam followers connected to the fly-weights.

The present invention relates to a variable speed, stepless, mechanical power transmitting device, the operating principle of which is similar to that of the device described in my co-pending applications, but represents a simplified version thereof. The simplifications embodied in FIGURES 1 to 8, compared to the simplest embodiment of my former applications, indicate the following relationships:

(1) A single rotor is used for the transfer of energy from the input to the output shaft of the device instead of the two or more rotors embodied in the device of said co-pending application.

(2) A single rotor pinion transmits energy to the rotor. Two rotor pinions are used for this purpose in the device of my co-pending application.

(3) A single composite gear is carried on the torque frame which engages the gears mounted in the stationary housing. The device of my co-pending application employs three gears on the torque frame to effect this purpose.

(4) The one-way clutches instead of being carried on the rotor shaft, as in my co-pending application, are, in the present invention, mounted within the housing and are not subjected to centrifugal and other dynamic forces caused by the precessional motion of the rotor shaft.

(5) The cyclical change of the rotor inertia in the present invention is the result of the continuous rotary motion of gear driven, rotating, eccentric fly-weights instead of being effected, as in the device of my co-pending application by sliding fly-weights actuated by the intermittent motion of cam followers.

Although the foregoing simplifications of the present device constitute improvements over the device of my previously filed co-pending application because of fewer mechanical elements of lesser complexity, these apparent advantages are partially offset by the fact that in the present invention the torque obtained on the output shaft is discontinuous; however, this characteristic of the present device can be compensated for by the flywheel effect of substantial rotary masses incorporated in the present device.

This invention is more fully described in the accompanying diagrams, of which:

FIGURE 4 is a fragmentary sectional view taken on line 4—4 of FIGURE 1.

FIGURE 5 is a fragmentary elevational view taken on line 5—5 of FIGURE 1, with the axis of the rotor displaced by 90°.

FIGURE 6 is a sectional view taken on line 6—6 on FIGURE 5.

FIGURE 7 is a view similar to FIGURE 5 but with the rotor axis displaced by 270°.

FIGURE 8 is a sectional view taken on line 8—8 on FIGURE 7.

FIGURE 10 is an elevational sectional view of another modified form of the embodiment illustrated in FIGURE 1.

FIGURE 11 is a sectional view taken on line 11—11 of FIGURE 10.

FIGURE 12 is a sectional view taken on line 12—12 on FIGURE 10.

Figure 1:
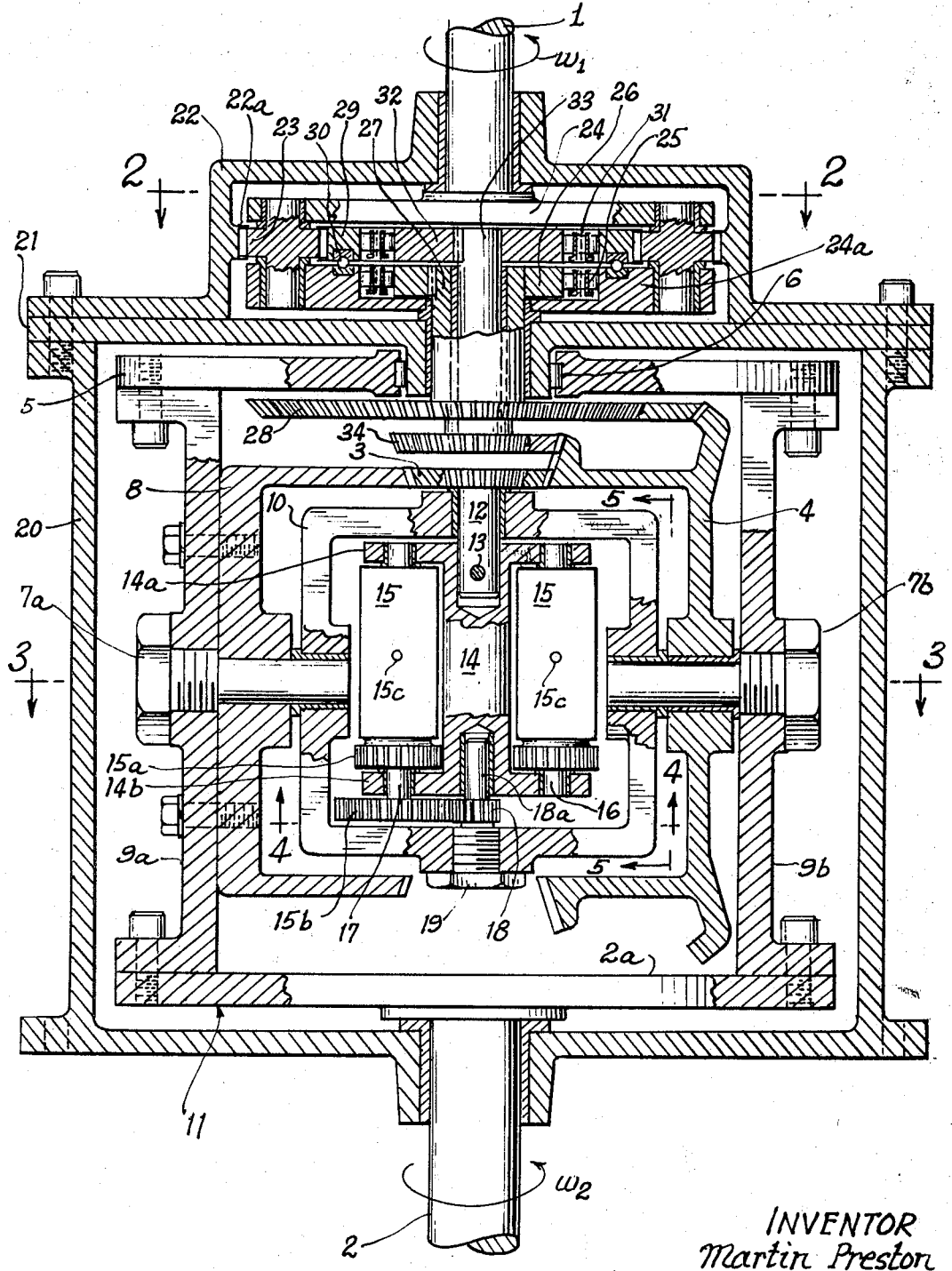
FIGURE 1 is an elevational sectional view of a simple embodiment of the device.
Figure 2:
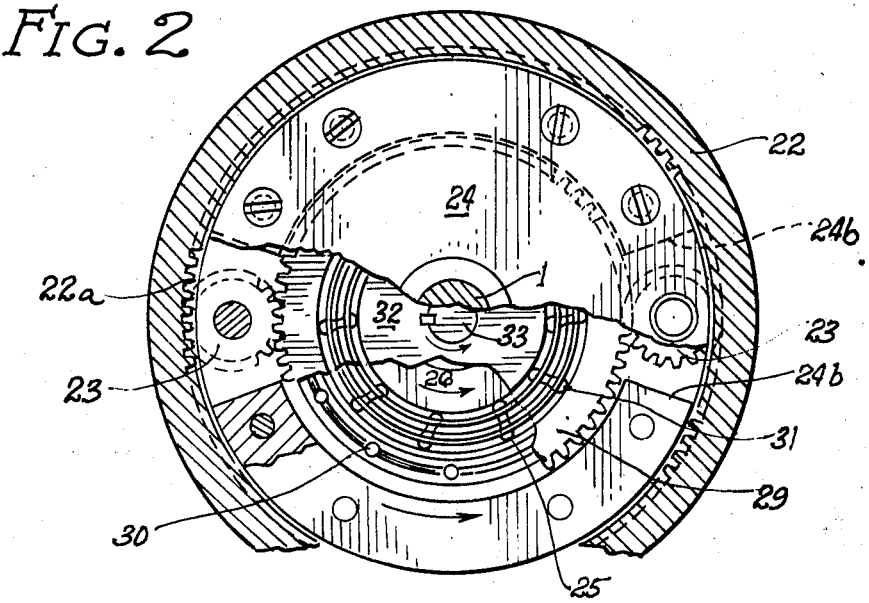
FIGURE 2 is a plan sectional view taken on line 2—2 on FIGURE 1.
Figure 3:
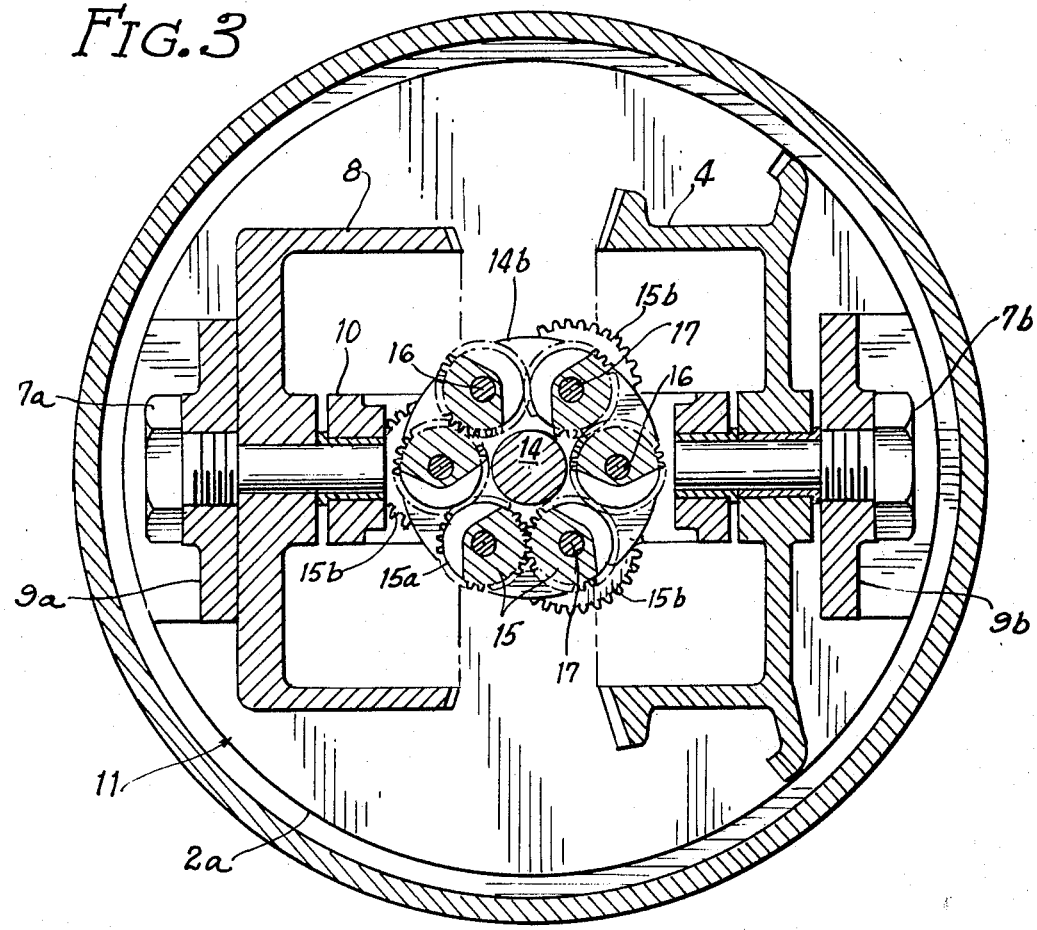
FIGURE 3 is a plan sectional view taken on line 3—3 of FIGURE 1.

The embodiment of the device shown in FIGURES 1-3 comprises an input shaft 1 driven by an external source of power and a coaxial output shaft 2 delivering power to the outside, both shafts being journalled in stationary housing 20 that comprises top cover 21 and gear case 22 in which input shaft 1 is journalled. The output shaft 2 is bushed in the bottom portion of housing 20.

The inside of the aforementioned gear case 22 forms an internal gear 22a which is in mesh with planet pinions 23 journalled on planet carrier 24. This planet carrier consists of an upper circular disk 24, integral with input shaft 1, a lower circular disk 24a and two arcuate spacers 24b (see FIGURE 2). These units form a rigid assembly having a substantial inertia. The aforesaid lower circular disk 24a serves also as the outer race of one-way clutch 25, the inner race 26 of which is keyed to tubular shaft 27 carrying on its lower end bevel gear 28.

Sun gear 29 supported on bearing 30 serves also as the outer race of one-way clutch 31 the inner race 32 of which is keyed to shaft 33 which carries on its lower end bevel pinion 34.

The above-described planetary gear train operates in the following manner: When input shaft 1 is rotated in the indicated direction (i.e. counterclockwise), one-way clutch 25 forces bevel gear 28 to rotate at the same speed and in the same direction as input shaft 1, but the one-way clutch does not prevent gear 28 from overrunning shaft 1. At the same time, sun gear 29 is forced by planet pinions 23 to rotate at more than twice the speed in the same direction as input shaft 1, but one-way clutch 31 does not transmit motion in the indicated direction from sun gear 29 to bevel pinion 34, but only prevents the latter from overrunning the former.

The size of these gears is so proportioned that the ratio of the speed of sun gear 29 to the speed of input shaft 1 is the same as the ratio of the tangents of the half central angles of bevel gear 28 to bevel pinion 34. During one phase of the working cycle bevel gear 28 is being driven by input shaft 1 through planet carrier 24 and one-way clutch 25 at speed $\omega_1$ in the direction indicated in FIGURE 1. During the succeeding phase of the working cycle bevel pinion 34 drives planet carrier 24 through pinion shaft 33, one-way clutch 31 and sun gear 29 in the direction indicated in FIGURE 2. The overall function of the above-described components of the mechanism is to transmit power at relatively high torque and low speed from the input shaft to bevel gear 28 during one phase of the operating cycle and also to provide a reverse flow of power from bevel pinion 34 at relatively high speed and low torque during another phase of the operating cycle. The balance of these two flows of power equals the power input received by input shaft 1, the torque fluctuations being evened out by the flywheel effect of planet carrier 24. The above-described components form a bifurcated power path, the juncture of which is a composite gear which drives a rotor having cyclically variable inertia, described hereinbelow.

Output shaft 2 carries on its upper end torque frame 11 consisting of circular bottom plate 2a which is integral with the output shaft, of side plates 9a and 9b and of circular top plate 5 which is journalled on bearing 6 mounted on a central, hub-like extension of top cover 21. The substantial inertia of the torque frame provides a flywheel effect in evening out the fluctuating torque applied thereto. Attached to side plates 9a and 9b are precession axles 7a and 7b which serve as pivots for rectangular gimbal frame 10. This frame carries the rotor assembly consisting of a cylindrical spool 14 with a circular top flange 14a and bottom flange 14b in which are journalled fly-weight shafts 16 and 17 carrying diametrically opposed eccentric fly-weights 15 in parallel axial alignment with the rotor axis. These fly-weights which should preferably be fabricated from a heavy metal, such as a tungsten alloy, to realize a high mass/volume ratio are shown as being made integral with gears 15a. The latter gears mesh with each other causing the fly-weights at all times to have a symmetrical orientation with respect to the center line of the rotor assembly which is the spin axis. The fly-weights are secured by pins 15c to fly-weight shafts 16 and 17. The latter extend through the bottom flange 14b of spool 14 and are keyed to drive gears 15b, as will be more evident from FIGURES 3 and 4. Drive gears 15b mesh with stationary pinion 18 which is cut into the center portion of pin 18a, the lower end 19 of which is screwed into gimbal frame 10. The rotor assembly itself is journalled in the lower portion of gimbal frame 10 by the aforementioned pin 18a and at the top by spin axle 12 which is integral with bevel pinion 3. Pin 13 secures spin axle 12 to spool 14 of the rotor assembly. Composite gear 4 bushed on precession axle 7b meshes simultaneously with bevel gear 28 and bevel pinions 34 and 3, the latter also being in mesh with bevel gear 8 which is rigidly attached to side plate 9a of torque frame 11.

The tilting of gimbal frame 10 about the horizontal precession axles 7a and 7b causes, through the interaction of bevel pinion 3 with bevel gear 8, the rotation of the entire rotor assembly about the spin axis which in FIGURE 1 coincides with the vertical center line of the device. The gear ratio between fixed pinion 18 and drive gear 15b being the same as the gear ratio between bevel pinion 3 and bevel gear 8, it necessarily follows that the angle of rotation of drive gear 15b with reference to the rotor assembly will be equal to the angle of tilt of the gimbal frame about the precession axle. Furthermore, it follows as a consequence of the foregoing relationship that during a full revolution of the gimbal frame about the precession axles, fly-weights 15 which are rigidly connected to drive gears 15b will rotate 360 degrees about their own axes, and during this period of 360° rotation the centers of gravity of the fly-weights will move between the maximum and minimum distances from the spin axis.

Designating the angle of tilt of the spin axis from the vertical with the symbol $\phi$, it will be seen from FIGURES 5–8 that the above mentioned extreme distances of the centers of gravity of the fly-weights from the spin axis will occur at $\phi=90°$ and at $\phi=270°$, at which angular positions the moment of inertia of the rotor assembly will be at its maximum and at its minimum value, respectively.

The simultaneous tilting and spinning of the rotor assembly is effected by the rotation of composite gear 4 which is simultaneously in mesh with bevel pinions 3 and 34 and with bevel gear 28. During the period of increasing moment of inertia of the rotor assembly, energy is transmitted from input shaft 1 through one-way clutch 25, bevel gear 28 and composite gear 4; conversely, during the period of decreasing moment of inertia of the rotor assembly energy is returned from the rotor assembly through composite gear 4, bevel pinion 34, one-way clutch 31 and sun gear 29 to the planetary carrier assembly whose ample inertia provides a flywheel effect.

Designating the rotational speed of composite gear 4 as $\omega_4$ it can be shown that the spin axis of the rotor will precess at the rate of $\frac{1}{2}\omega_4$ in the direction indicated in FIGURES 5 and 7. This follows from the fact that rotor pinion 3 whose centerline represents the spin axis is interposed between fixed bevel gear 8 and composite gear 4. The spin velocity of the rotor with reference to gimbal frame 10 is designated as $\omega_3$ in the drawings and it should be noted that inasmuch as the gimbal frame itself is being rotated by torque frame 11 at speed $\omega_2$ about the vertical axis (see FIGURE 1), the total spin velocity of the rotor will be $\omega_3+\omega_2 \cos \phi$ in which the second term represents the vector component of the output shaft velocity referred to the spin axis.

The operation of the device as a whole will be now considered under the assumption that input shaft 1 is being driven at constant speed by an external source of power. This will give rise to three alternative operating conditions: (a) the output shaft is held fast, (b) the output shaft rotates at a constant speed which is lower than the speed of the input shaft, and (c) the output shaft runs at the same speed as the input shaft. In condition (a) torque frame 11 will be at rest and slippage in one-way clutches 25 and 31 will be zero at all times. During one half precessional revolution starting at $\phi=-\pi/2$ (see FIGURE 7) and ending at $\phi=+\pi/2$ (see FIGURE 5), power will be transmitted from planet carrier 24 through one-way clutch 25, bevel gear 28, composite gear 4 and bevel pinion 3 to the rotor assembly, the kinetic energy of which will increase from its minimum to its maximum value during this period. During the succeeding period, that is, between $\phi=+\pi/2$ and $$\phi=+\frac{3}{2}\pi$$

while the kinetic energy of the rotor reverts to its minimum value, the process is reversed and power will be returned from the rotor assembly through bevel pinion 3, composite gear 4, bevel pinion 34, one-way clutch 31, sun gear 29 and planet pinion 23 to planet carrier 24. The net flow of energy to and from the planet carrier will be, therefore, zero during the full cycle comprising a full precessional revolution of the spin axis. However, comparing the mean value of the torque transmitted by bevel gear 28 at relatively low speed during the first half of the cycle, to the mean value of the torque applied during the second half of the cycle to bevel gear 34 running at relatively high speed, it will be evident that these torque values will be inversely proportional to the speed of the respective gears, in accordance with the basic requirements of the law of conservation of energy, frictional losses being disregarded. Furthermore, it may be concluded that the resultant mean value of the torque acting on torque frame 11 on which composite gear 4 is mounted will be one half the difference of the above defined two mean values of torque. It can be also shown that the resultant mean torque acting on torque frame 11 (and hence on output shaft 2) will be proportional to the square of the input shaft speed. This follows from the fact that the kinetic energy of the rotor at any given moment is proportional to the square of the input shaft speed.

In the aforementioned alternative operating condition (b) in which the output shaft speed, $\omega_2$, is constant but less than the input shaft speed $\omega_1$, the relative spin velocity $\omega_3$ and precessional velocity $\frac{1}{2}\omega_4$ of the rotor will be less than in condition (a). The reduction of these velocities will be proportional to the output shaft speed $\omega_2$. Also, the precessional angle subtending the power transfer to and from the rotor will be reduced from the 180° prevailing in condition (a). The greater the speed $\omega_2$ the larger will be the reduction of this angle and hence, the longer will be the intervals between the two periods of power transmittal during a full precessional revolution. In contrast to condition (a) the energy transmitted from bevel gear 28 to composite gear 4 during the first phase of the working cycle will be larger than the energy fed back from composite gear 4 to bevel pinion 34 during the second phase of the cycle. Furthermore, generally, the higher the output shaft speed, the lower will be the output torque. Finally, one or both of the one-way clutches 25 and 31 will be subjected to slippage at all times.

When the aforementioned alternative operating condition (c) obtains, the speed of the output shaft equals that of the input shaft. Under these circumstances the rotor assembly together with the gimbal frame and torque frame will rotate as a solid body without any relative motion of the components. This means that both the relative spin velocity $\omega_3$ and the precessional velocity $\frac{1}{2}\omega_4$ of the rotor will be zero. For this condition, the output torque will have an upper limiting value which will be proportional to the square of the common speed of the input and output shafts. Depending on the external load which has to be equal or smaller than the limiting value of the output torque, the position taken by the spin axis will be intermediate between the positions shown in FIGURE 5 and 7.

Comparing the above-described performance characteristics with those attributed to the embodiments of my co-pending application, it would appear that the range of these characteristics, that is, the range of the obtainable output torque versus speed ratios, is narrower for the present device. Thus, the output torque generally cannot be made independent from the speed of the output shaft. In the device of my co-pending application, the independence of the output torque from the output speed is obtained by the judicious proportioning of the gear train elements which terminate in the "anchor pinion" rigidly attached to the bottom of the stationary housing, as shown in FIGURE 1b of said co-pending application. Corresponding results can be obtained for the present device by the use of a similar gear arrangement which, of course, would involve cost of added mechanical complexity.

Figure 9:
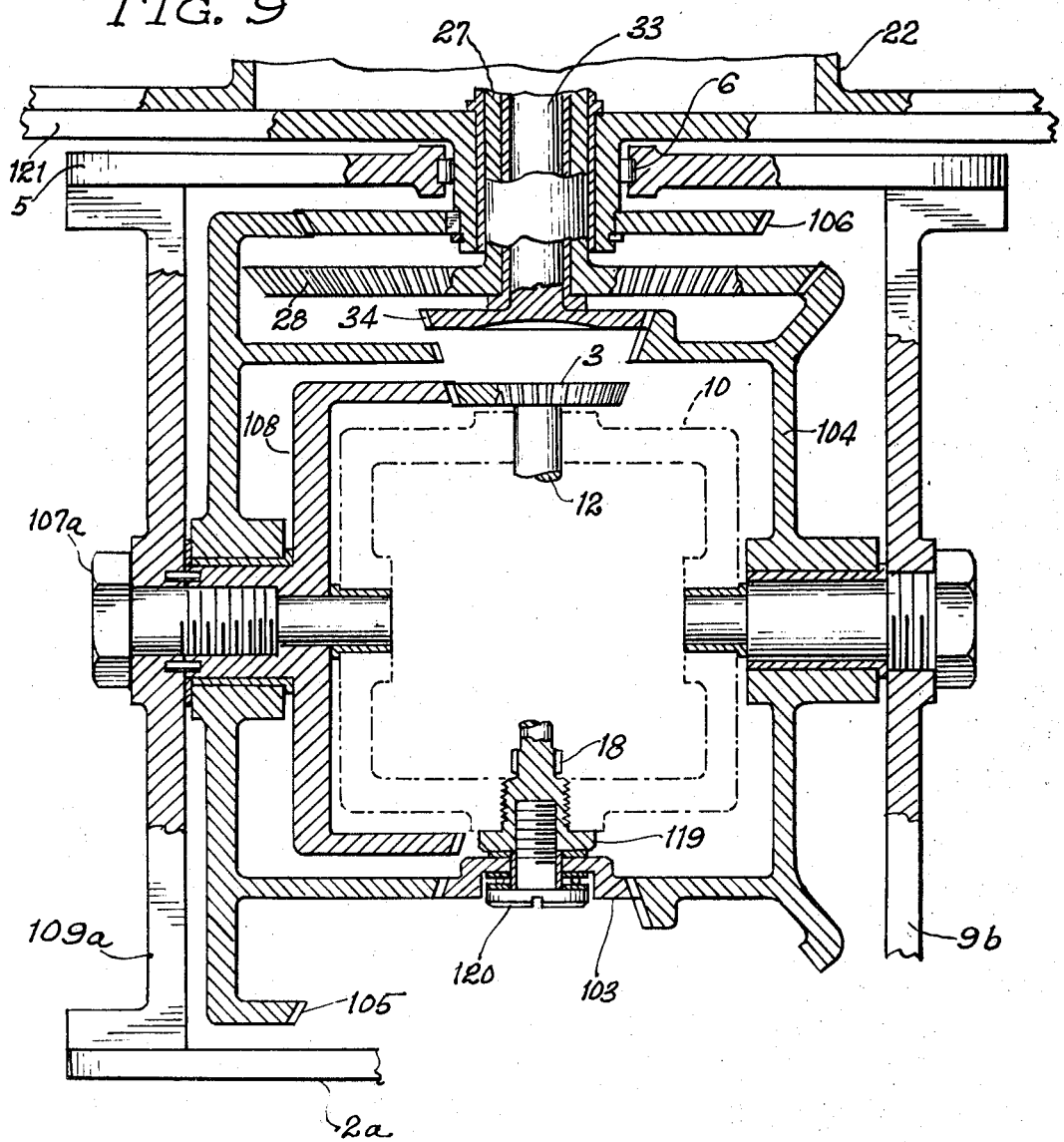
FIGURE 9 is an elevational sectional view of a modified form of the embodiment illustrated in FIGURE 1.

Such a modification of the present embodiment that would (at constant input speed) provide a constant output torque independent from the output speed, or alternatively, an output torque that increases at increasing output speed is shown in FIGURE 9. Comparing this with the embodiment shown in FIGURE 1, it will be observed that composite gear 104 instead of meshing with rotor pinion 3 meshes with new idler pinion 103 journalled on pin 120. Pin 120 is attached to (for example and for convenience of assembly, by being screwed into) pin 119, the latter serving like its counterpart in the previously described embodiment, as a trunnion for the rotor. Similarly, rotor pinion 3, as before, meshes with fixed bevel gear 108 which is rigidly connected to side plate 109a of the torque frame by precession axle 107a. Journalled on the latter axle is new composite transfer gear 105 in mesh with new anchor pinion 106 which is keyed to the central-hub-like extension of top cover 121.

It can be shown that the spin velocity of the rotor, other things being equal, may decrease, remain constant, or may increase at increasing output shaft speed, depending on the gear ratio of anchor pinion 106 to composite transfer gear 105. The greater the central angle of anchor pinion 106, the higher will be the spin velocity of the rotor and the greater will be the torque acting on the output shaft, other things being equal.

For a given input speed the stall torque (defined as the external resisting torque just sufficient to prevent rotation of the output shaft) depends for both of the embodiments shown in FIGURES 1 and 9 on the ratio of the tangents of the half central angles of bevel gear 28 and bevel pinion 34. The higher this ratio, the greater will be the stall torque. As was set forth in the description of the planetary gear set, this ratio also equals the speed ratios of sun gear 29 to input shaft 1.

For the planetary gear arrangemet shown in the drawings, this ratio is always higher than 2:1. However, using a different gear train design (e.g. by the use of composite planet pinions, that is, pinions provided with the two sets of gear teeth having different pitch diameters, the set having the larger pitch diameter being in mesh with the internal gear and the set with the smaller pitch diameter being in mesh with the sun gear), this ratio can be reduced to within the range of from 1:1 to 2:1. With such a lower gear ratio the rate at which the output torque drops at increasing output speed (the input speed being assumed constant) will be correspondingly diminished. However, this reduced gear ratio will also entail a considerable reduction of the stall torque, the value of which is a quadratic function of said gear ratio.

The operation of the embodiments described in the foregoing is based on the transfer of kinetic energy to and from the rotor. The fluctuating kinetic energy of the rotor is imparted by the following five simultaneous motions: (1) rotation about its own axis on which is superimposed (2) the rotation of the eccentric fly-weights, (3) the precessional motion of the spin axis involving the tilting of the gimbal frame and, finally, the rotational vector components (4) about the spin axis and (5) at right angles thereto, contributed by the rotation of the torque frame.

A simplification of the mechanism shown in FIGURE 1 can be obtained by eliminating the gimbal frame 10, the rotor pinion 3 and bevel gear 8 from the structure and by integrating rotor spool 14 with composite gear 4 into a single unit which is designated with the numeral 204 in FIGURE 10 representing the modified portion of the original mechanism shown in FIGURE 1. As shown in FIGURES 10–12, composite gear 204 meshes, as before, simultaneously with bevel gear 28 and bevel pinion 34 and forms with flange 214 and hollow stem 209 the rotor spool which is journalled on shaft 207 that is affixed to side plates 9a and 9b of the torque frame by nuts 208. The eccentric fly-weights 215 affixed by pins 211 to fly-weight shafts 216 and 217 journalled, as before, in the flanges of the rotor spool, are rotated by gears 212 and 213, respectively. Gears 213 in turn mesh with central pinion 218 mounted on shaft 207 and held by pins 206 inserted through side plate 9a. Spacer 205 mounted on shaft 207 keeps pinion 218 in axial alignment.

The functioning of this modified embodiment is similar to the previously described one. Corresponding to the cyclic change of the moment of inertia of the rotor, power is cyclically exchanged between the rotor and the two reservoirs of kinetic energy represented by the rotary masses associated with the planet carrier (affixed to the input shaft) and with the torque frame (affixed to the output shaft).

Figure 13:
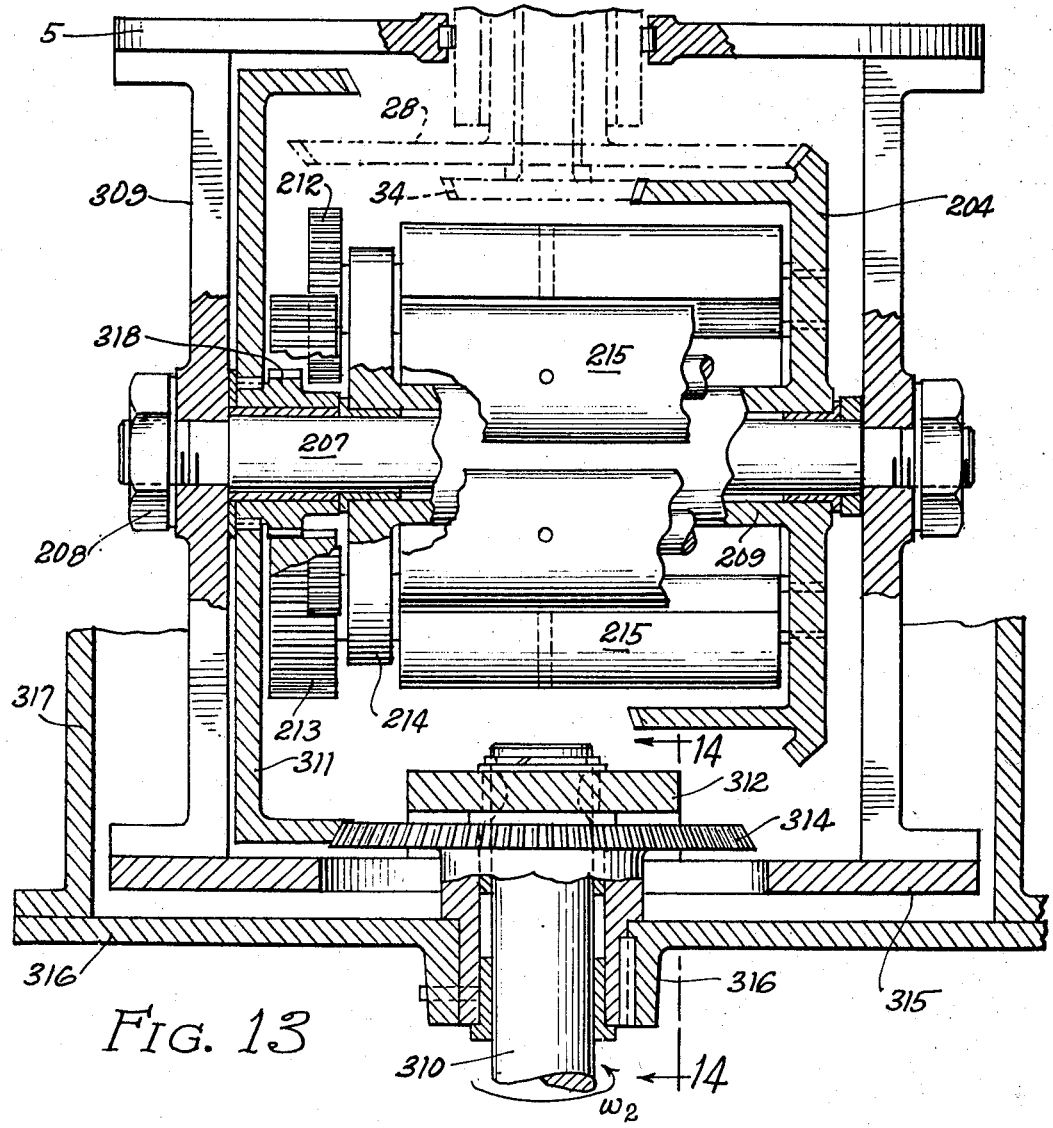
FIGURE 13 is an elevational sectional view of a modified form of the embodiment shown in FIGURE 10.
Figure 14:
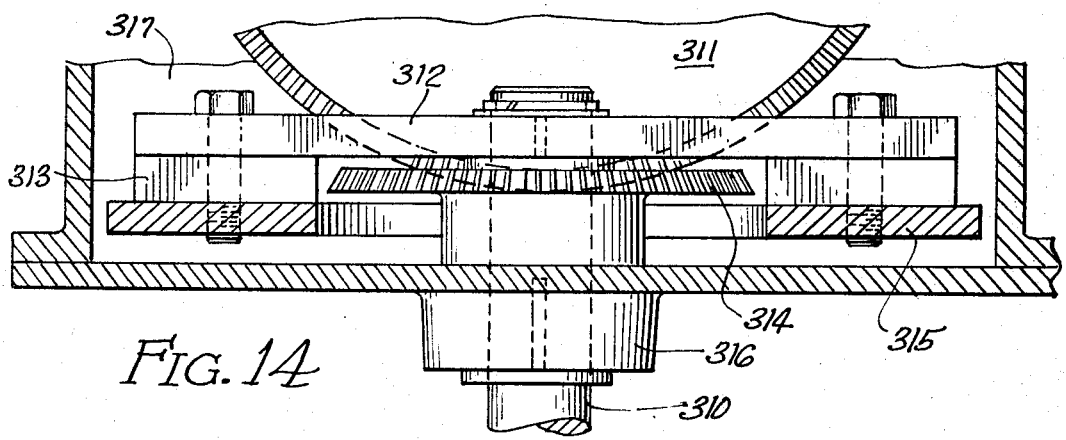
FIGURE 14 is a sectional view taken on line 14—14 on FIGURE 13.

Previously, in describing the operation of the original embodiment, five velocity components were listed as contributing to the kinetic energy of the rotor. In the modified embodiment, presently under discussion, two of these velocity components (3 and 4) are absent. As a result of this, the rate at which the output torque drops with an increase of the output shaft speed will be considerably higher than would be otherwise, the speed of the input shaft being assumed to be constant. A further result of this is that the output torque will vanish altogether well before the output shaft attained the speed of the input shaft. To overcome this difficulty a further modification of the design, as shown in FIGURES 13–14, is proposed. This further modification entails no change in the design of the rotor or in its drive arrangement except that fixed, central pinion 218 in FIGURE 10 is replaced in FIGURE 13 by pinion 318 which is journalled on shaft 207 and is keyed to transfer gear 311 that meshes with anchor pinion 314. The latter is rigidly attached to bottom 316 of the stationary housing, which is in turn bolted to the flange of the cylindrical middle portion 317 of the housing. The only other modification shown in FIGURES 13 and 14 is the torque frame and its attachment to output shaft 310. The latter is journalled in the hub of anchor pinion 314 and its upper end is keyed to cross bar 312 which in turn is connected to annular base 315 through spacers 313. Annular base 315 carries side plates 309 connected at their upper ends by top plate 5 of the torque frame.

Comparing the functioning of the embodiment of FIGURES 10–12 with that of FIGURES 13–14 it will be seen that in the latter the new transfer gear 311 interposed between central pinion 318 and the stationary anchor pinion 314 will tend to speed up the rotation of the eccentric fly-weights 215 about their individual axes of rotation when the rotational speed of the torque frame, that is, of the output shaft increases. On the other hand, the spin velocity of the rotor spool, that is, of composite gear 204 tends to decrease at increasing output shaft speed, under the assumption that the input shaft speed remains constant.

Since the frequency of the cylical change of the rotor inertia is proportional to the sum of the velocities of the rotor spool and that of the central pinion 318, and furthermore, since at increasing output shaft speed the former of these two velocities increases while the latter decreases it can be concluded, that by the proper choice of the gear ratio of transfer gear 311 to anchor pinion 314, the frequency of fluctuations of the rotor inertia can be made independent from the output shaft speed, or alternatively, can be made to increase with increasing output shaft speed.

Contrastingly, the gearing arrangement of the embodiment shown in FIGURES 10–12 is such that the frequency of fluctuations of the rotor inertia decreases at increasing output shaft speed and becomes zero when the output shaft attains the speed of the input shaft. Since the operation of the device depends on the cyclical change of the rotor inertia, the embodiment of FIGURES 13–14 has a wider operational range than the embodiment of FIGURES 10–12.

The variable inertia rotor is shown in the embodiments illustrated on the accompanying diagrams as comprising six fly-weights; however, it should be noted that four or even two fly-weights could be used instead to perform substantially the same function.

I claim as my invention:

1. A mechanical torque converter comprising a stationary housing in which a first shaft and a second shaft are journalled, the first shaft being driven by an external source of power and the second shaft delivering power to the outside; a torque frame fixedly connected to said second shaft; a variable inertia rotor journalled within said torque frame and carrying at least two fly-weights movably mounted on said rotor in such a manner that the radial distance between the centers of gravity of said fly-weights and the axis of rotation of said rotor can be varied; means for controlling said radial distance as a prescribed function of the angle of rotation of said rotor; a gear train mounted in said stationary housing and driven by said first shaft, said gear train being drivingly connected by gear means to said rotor so that said gear train constitutes a bifurcated power path between said first shaft and said rotor, one branch of which delivers power periodically to said rotor and the other branch receives power periodically from said rotor; a first one-way clutch interposed in said one branch of the power path; a second one-way clutch interposed in said other branch of the power path.

2. The device of claim 1 further characterized in that said means for controlling the radial distance between the centers of gravity of the fly-weights and the axis of rotation of said rotor consist of an auxiliary gear train which drivingly connects all fly-weights with a pinion fixedly attached to said torque frame, said fly-weights being rotatably mounted on shafts arranged in axial symmetry about the center line of said rotor, the center of gravity of said fly-weights being eccentric in relation to said shafts on which they are mounted.

3. The device of claim 1 further characterized in that said gear means which drivingly connect said gear train to said rotor consist of a composite gear that is integral with said rotor and constitutes the juncture of said two branches of said bifurcated power path.

4. The device of claim 1 further characterized in that said means for controlling the radial distance between the centers of gravity of the fly-weights and the axis of rotation of said rotor consist of an auxiliary gear train which drivingly connects all fly-weights with a pinion that is rigidly connected to a transfer gear which is rotatably mounted on said torque frame, said fly-weights being mounted on shafts arranged in axial symmetry about the axis of rotation of said rotor, the centers of gravity of said fly-weights being eccentric in relation to said shafts on which they are mounted; an anchor pinion rigidly affixed to said stationary housing and in mesh with said transfer gear.

5. A mechanical torque converter comprising a stationary housing in which a first shaft and a second shaft are journalled, the first shaft being driven by an external source of power and the second shaft delivering power to the outside; a torque frame fixedly connected to said second shaft; a gimbal frame rotatably mounted on said torque frame; a spin axle rotatably mounted in said gimbal frame, said spin axle carrying a variable inertia rotor comprising at least two fly-weights movably mounted on said rotor in such a manner that the radial distance between the centers of gravity of said fly-weights and the center line of said spin axle can be varied; means for controlling said radial distance as a prescribed function of the angle of tilt of said gimbal frame; a gear train mounted in said stationary housing and driven by said first shaft, said gear train being drivingly connected by gear means to said spin axle so that said gear train constitutes a bifurcated power path between said first shaft and said spin axle, one branch of which delivers power periodically to said spin axle and the other branch receives power periodically from said spin axle; a first one-way clutch interposed in said one branch of the power path; a second one-way clutch interposed in said other branch of the power path.

6. The device of claim 5 further characterized in that said means for controlling the radial distance between the centers of gravity of the fly-weights and the center line of the spin axle consists of an auxiliary gear train which drivingly connects all fly-weights with a pinion fixedly attached to said gimbal frame, said fly-weights being rotatably mounted on shafts arranged in axial symmetry about the center line of said spin axle, the center of gravity of said fly-weights being eccentric in relation to said shafts on which they are mounted.

7. The device of claim 5 further characterized in that said gear train constituting a bifurcated power path comprises a planetary gear set consisting of a sun gear, of a planet carrier with pinions and of an internal gear, said planet carrier being drivingly connected to said first shaft, said internal gear being fixedly attached to said stationary housing; a bevel pinion drivingly connected through a first one-way clutch to said sun gear; a bevel gear which is being driven through a second one-way clutch by said planet carrier; a composite gear rotatably mounted on said torque frame, said composite gear being in mesh simultaneously with said bevel pinion and with said bevel gear and thus constituting the juncture of said two branches of said bifurcated power path; a fixed bevel gear rigidly attached to said torque frame; a rotor pinion keyed to said spin axle and being in simultaneous mesh with said fixed bevel gear and said composite gear.

8. The device of claim 5, further characterized in that an anchor pinion is rigidly attached to said stationary housing; an idler pinion freely journalled on said gimbal frame; a composite transfer gear rotatably mounted on said torque frame and simultaneously meshing with said anchor pinion and with said idler pinion; a fixed bevel gear rigidly attached to said torque frame; a rotor pinion keyed to said spin axle and in mesh with said fixed bevel gear; a composite gear rotatably mounted on said torque frame and in mesh with said idler pinion, said composite gear constituting the juncture of said two branches of said bifurcated power path.

References Cited

UNITED STATES PATENTS

| | | | |
|---|---|---|---|
| 3,075,409 | 1/1963 | Amsler | 74—752 X |
| 3,153,353 | 10/1964 | Voigt | 74—751 |
| 3,154,971 | 11/1964 | Cicin | 74—751 |
| 3,394,619 | 7/1968 | Preston | 74—751 |

ROBERT M. WALKER, *Primary Examiner.*

THOMAS C. PERRY, *Assistant Examiner.*

U.S. Cl. X.R.

74—752